(12) United States Patent
Lai

(10) Patent No.: US 10,520,701 B2
(45) Date of Patent: Dec. 31, 2019

(54) OPTICAL LENS

(71) Applicant: HON HAI PRECISION INDUSTRY CO., LTD., New Taipei (TW)

(72) Inventor: Cheng-Yi Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 48 days.

(21) Appl. No.: 15/835,412

(22) Filed: Dec. 7, 2017

(65) Prior Publication Data

US 2019/0129136 A1    May 2, 2019

Related U.S. Application Data

(60) Provisional application No. 62/578,529, filed on Oct. 30, 2017.

(51) Int. Cl.
*G02B 9/62* (2006.01)
*G02B 27/00* (2006.01)
*G02B 13/00* (2006.01)
*G02B 13/04* (2006.01)

(52) U.S. Cl.
CPC ........... *G02B 9/62* (2013.01); *G02B 13/0045* (2013.01); *G02B 13/04* (2013.01); *G02B 27/0025* (2013.01)

(58) Field of Classification Search
CPC .. G02B 13/0045; G02B 9/62; G02B 27/0025; G02B 13/18; G02B 5/005; G02B 3/04; G02B 5/208; G02B 13/002; G02B 7/021; G02B 13/001; G02B 13/06; G02B 13/0015; G02B 13/04; G02B 13/00; G02B 27/646; G02B 13/006; G02B 13/16; G02B 15/17; G02B 15/177; G02B 1/041
See application file for complete search history.

(56) References Cited

U.S. PATENT DOCUMENTS

| | | | | |
|---|---|---|---|---|
| 9,733,455 | B1* | 8/2017 | Liao | G02B 9/64 |
| 2012/0194726 | A1* | 8/2012 | Huang | G02B 13/0045 348/340 |
| 2012/0243108 | A1* | 9/2012 | Tsai | G02B 13/0045 359/713 |
| 2012/0314301 | A1* | 12/2012 | Huang | G02B 9/62 359/713 |

FOREIGN PATENT DOCUMENTS

TW    I576630 B    4/2017

* cited by examiner

*Primary Examiner* — Evan P Dzierzynski
*Assistant Examiner* — Sharrief I Broome
(74) *Attorney, Agent, or Firm* — ScienBiziP, P.C.

(57) ABSTRACT

An optical lens of the present disclosure assembly includes, in order from an object side to an image side, a first lens element, a second lens element, a third lens element, a fourth lens element, a fifth lens element, a sixth lens element, an optical filter and a sensor. The optical lens also has an axis. The first lens element, the fourth lens element and the sixth lens element have negative power, the second lens element, the third lens element and the fifth lens element have positive power.

10 Claims, 9 Drawing Sheets

OPTICAL LENS

CROSS-REFERENCE TO RELATED APPLICATIONS

This application claims priority to U.S. Patent Application No. 62/578,529 filed on Oct. 30, 2017, the contents of which are incorporated by reference herein.

FIELD

The subject matter herein generally relates to a lens, especially, relates to an optical lens.

BACKGROUND

In a field of photography, an optical lens is used to acquire visible light to capture the images. Moreover, the optical lens having a wide angle can acquire more visible light and is more widely used.

Generally, In order to get a more compact optical system, the size of image sensor has became smaller. If we keep the same resolution of sensors, the pixel size should be smaller to reduce the length of optical system, so the color aberration has became more and more important to optical design. Nowadays, an optical system with compact size, low optical aberration and good tolerance endurance are needed for the optical lens.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
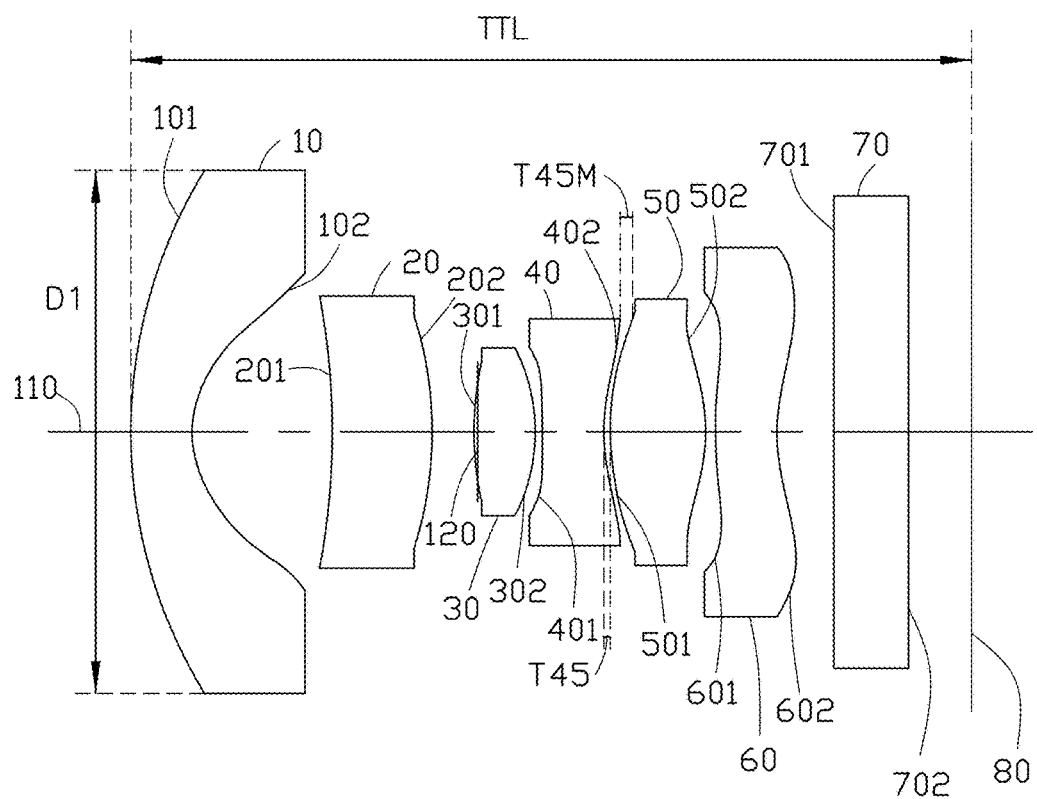
FIG. 1 is a diagrammatic, cross sectional view of an optical lens of the present disclosure.

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

An optical lens of the present disclosure assembly includes, in order from an object side to an image side, a first lens element 10, a second lens element 20, a third lens element 30, a fourth lens element 40, a fifth lens element 50, a sixth lens element 60, an optical filter 70 and a sensor 80.

The optical lens also has an axis 110. The first lens element 10, a second lens element 20, a third lens element 30, a fourth lens element 40, a fifth lens element 50 and a sixth lens element 60 are symmetrical about the axis 110.

The first lens element 10 has negative power and has a first surface 101 and a second surface 102 opposite to the first surface 101. The first surface 101 is aspheric and convex around the axis 110 and toward the object side. The second surface 102 is aspheric. A center of the second surface 102 is concave around the axis 110 and toward the image side. A periphery of the second surface 102 is a flat surface.

The second lens element 20 has positive power. The second lens element 20 has a third surface 201 and a fourth surface 202. The third surface 201 is aspheric and is concave around the axis 110 and toward the object side. The fourth surface 202 is aspheric and is convex around the axis 110 and toward the image side.

The third lens element 30 has positive power. The third lens element 30 has a fifth surface 301 and a sixth surface 302. The fifth surface 301 is aspheric and is convex around the axis 110 and toward the object side. The sixth surface 302 is aspheric. The sixth surface 302 is convex around the axis 110 and toward the image side.

An aperture 120 is mounted between the second lens element 20 and the third lens element 30. The aperture 120 is located on the optical axis 110. A distance between the aperture 120 and the fifth surface 301 is smaller than a distance between the fourth surface 202 and the aperture 120.

The fourth lens element 40 has negative power. The fourth lens element 40 has a seventh surface 401 and a eighth surface 402. A center of the seventh surface 401 is concave around the axis 110 and toward the object side. The eighth surface 402 is concave around the axis 110 and toward the image side.

The fifth lens element 50 has positive power. The fifth lens element 50 has a ninth surface 501 and a tenth surface 502. Both the ninth surface 501 and the tenth surface 502 are aspheric. The ninth surface 501 is convex around the axis 110 and toward the object side. The tenth surface 502 is convex around the axis 110 and toward the image side.

The sixth lens element 60 has negative power. The sixth lens element 60 has an eleventh surface 601 and a twelfth surface 602. The eleventh surface 601 is aspheric. The eleventh surface 601 is convex around the axis 110 and toward the object side. The twelfth surface 602 is concave around the axis 110 and toward the image side.

The optical filter 70 has a front surface 71 and a rear surface 72. The front surface 71 and the rear surface are flat plane. The optical filter 70 is used to filter infrared light throughout the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 are aspherical surfaces. The even aspherical surface are shaped according to the formula:

$$Z = \frac{ch^2}{1+\sqrt{1-(k+1)c^2h^2}} + \sum A_i h^i \quad (a)$$

Wherein Z is aspherical surface sag of surface, h is a surface height from the optical axis 110, c is a curvature, k is a conic constant, and Ai are i-th order aspheric coefficients of surface.

The optical lens satisfies the formulas:

$0<T45<0.1$ (1)

$0<T45M<0.2$ (2)

$1.02<N4/N5<1.58$ (3)

$0.28<V4/V5<0.85$ (4)

$0.77<f1/(f4*f5)<2.75$ (5)

$1.12<TTL/IMH<3.05$ (6)

$90°<2\omega<150°$ (7)

$0.35<D1/(R1*R2)<16.31$ (8)

Wherein, T45 is a center thickness of air space between the eighth surface 402 and the ninth surface 501. T45M is maximal thickness of air space between the eighth surface 402 parallel the axis 110 to the ninth surface 501. N4 is refraction index of the fourth lens element 40. N5 is the refraction index of the fifth lens element 50. V4 is the abbe number of the fourth lens element 40. V5 is the abbe number of the fifth lens element 50. The f1 is the focal length of the first lens element 10. F4 is the focal length of the fourth lens element 40. F5 is the focal length of the fifth lens element 50. TTL is totally length, from center point of the first surface 101 to the sensor 80. IMH is the max image circle of the sensor 80. ω is a half field view angle of the optical lens. D1 is clear aperture diameter of the first lens element 10, R1 is radius of curvature of the first surface 101 of the first lens element 10, R2 is radius of curvature of the second surface 102 of the first lens element 10.

The formulas (1)-(4) are used to reduce the color aberration of the optical lens. The formula (5) is used to balance power of between the first lens element 10, a fourth lens element 40 and the fifth lens element 50 and improve the tolerance sensitivity of the optical lens. The formula (6) is used to define the ratio of the optical lens and max image circle. The formula (7) is used to define the view angel of the optical lens. The formula (8) is used to control the ration of the first lens element 10 diameter and radius of curvature to keep the compact size of the optical lens.

The following embodiment specifically illustrated the optical lens by different parameter.

Referring to tables 1-5 illustrated an optical lens of a first embodiment. In the first embodiment, the optical lens satisfies the parameter of tables 1-2. The symbols listed below are used in tables 1-2.

R: a radius of curvature.
L: a distance between surfaces on the axis 110.
N: a refractive index of lens element.
V: an Abbe number.
h: a height from the axis 110 to the surface.
k: a conic constant.

TABLE 1

| Surf. Type | # | Lens element | R | L(mm) | N | V | H | K |
|---|---|---|---|---|---|---|---|---|
| Object | | | Infinity | 44 | | | | |
| Even Asphere | First surface | First lens element | 1.60 | 0.25 | 1.54 | 56 | 1.05 | 0.82 |
| Even Asphere | Second surface | air space | 0.45 | 0.57 | | | 0.64 | −0.77 |
| Even Asphere | Third surface | Second lens element | 40.65 | 0.41 | 1.64 | 22.4 | 0.55 | 0.00 |
| Even Asphere | Fourth surface | air space | −1.48 | 0.19 | | | 0.47 | −3.13 |
| Standard | aperture | air space | Infinity | −0.01 | | | 0.28 | 0.00 |
| Even Asphere | Fifth surface | Third lens element | 1.64 | 0.25 | 1.54 | 56 | 0.29 | 19.14 |
| Even Asphere | Sixth surface | air space | −1.35 | 0.03 | | | 0.34 | 9.68 |
| Even Asphere | Seventh surface | Fourth lens element | 54.37 | 0.25 | 1.64 | 22.4 | 0.34 | 0.00 |
| Even Asphere | Eighth surface | air space | 0.76 | 0.03 | | | 0.46 | −11.28 |
| Even Asphere | Ninth surface | Fifth lens element | 1.30 | 0.39 | 1.54 | 56 | 0.49 | 2.71 |
| Even Asphere | Tenth surface | air space | −0.64 | 0.04 | | | 0.53 | −4.78 |
| Even Asphere | Eleventh surface | Sixth lens element | 1.42 | 0.25 | 1.64 | 22.4 | 0.56 | −10.81 |
| Even Asphere | Twelfth surface | air space | 0.68 | 0.23 | | | 0.74 | −8.64 |
| Standard | Front surface | IRCF | Infinity | 0.30 | 1.52 | 54.5 | | |
| Standard | Rear surface | air space | Infinity | 0.26 | | | | |
| Sensor | | | Infinity | — | | | | |

TABLE 2

| Aspheric coefficient | First lens element | | Second lens element | | Third lens element | | Fourth lens element |
|---|---|---|---|---|---|---|---|
| | First surface | Second surface | Third surface | Fourth surface | Fifth surface | Sixth surface | Seventh surface |
| A2 | 0 | 0 | 0 | 0 | 0 | 0 | 0 |
| A4 | −0.0558 | 0.2907 | −0.7005 | −0.0825 | 0.5666 | −1.0337 | −4.5224 |
| A6 | −0.0651 | −0.5138 | 0.5756 | 2.5544 | −9.7108 | −2.9166 | 21.0018 |
| A8 | −0.0099 | 3.4905 | 1.1224 | −5.1453 | 82.2702 | −12.1002 | −86.8248 |
| A10 | 0 | −14.9547 | −3.4812 | −30.5791 | −165.663 | −78.2851 | −459.5653 |
| A12 | 0 | −16.2846 | −23.6536 | 0 | −26022.2 | −6942.59 | −2959.12745 |
| A14 | 0 | 12.11929 | 309.4619 | 0 | 154665.7 | 16318.04 | 1494.23655 |
| A16 | 0 | 0 | 0 | 0 | 0 | 0 | 0 |

| Aspheric coefficient | Fourth lens element | Fifth lens element | | Sixth lens element | |
|---|---|---|---|---|---|
| | Eighth surface | Ninth surface | Tenth surface | Eleventh surface | Twelfth surface |
| A2 | 0 | 0 | 0 | 0 | 0 |
| A4 | −0.8406 | 0.0933 | 0.8295 | −0.9652 | −0.8499 |
| A6 | 5.9345 | 0.1744 | 0.4395 | −0.864 | 0.9828 |
| A8 | −12.2132 | −2.949 | 2.0713 | 1.3979 | −0.9602 |
| A10 | −22.0521 | 2.4993 | 0.3341 | 4.8392 | −0.2654 |
| A12 | −242.414 | 39.95249 | 4.126123 | −13.319 | 0.233212 |
| A14 | 729.87 | −362.359 | −111.358 | −81.2235 | −0.05248 |
| A16 | 0 | 0 | 0 | 0 | 0 |

According to an example of the optical lens of the first embodiment, wherein: EFL=0.79; F=2.4; 2ω=112.1°; TTL=3.41; IMH=2.163; T45=0.03; T45M=0.05; N4/N5=1.06; V4/V5=0.40; f1/(f4*f5=1.25; D1/(R1*R2)=2.92.

Figure 2:
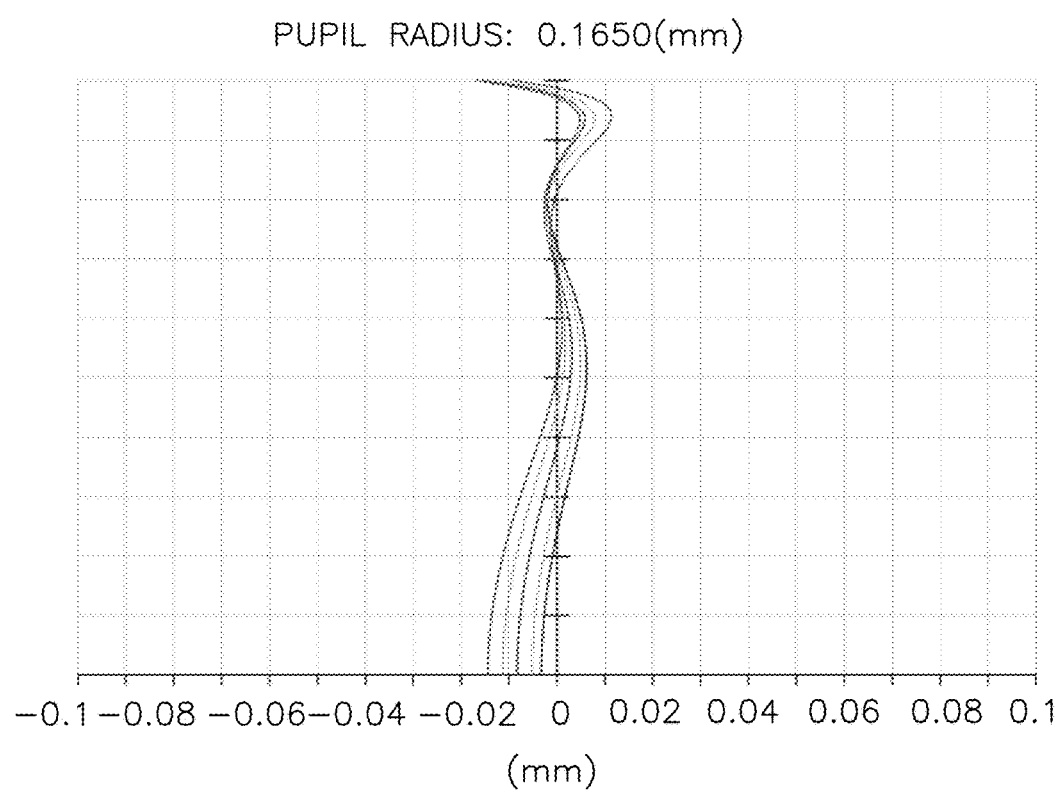
FIG. 2 is a graph showing longitudinal spherical aberration of the optical lens of a first embodiment.
Figure 3:
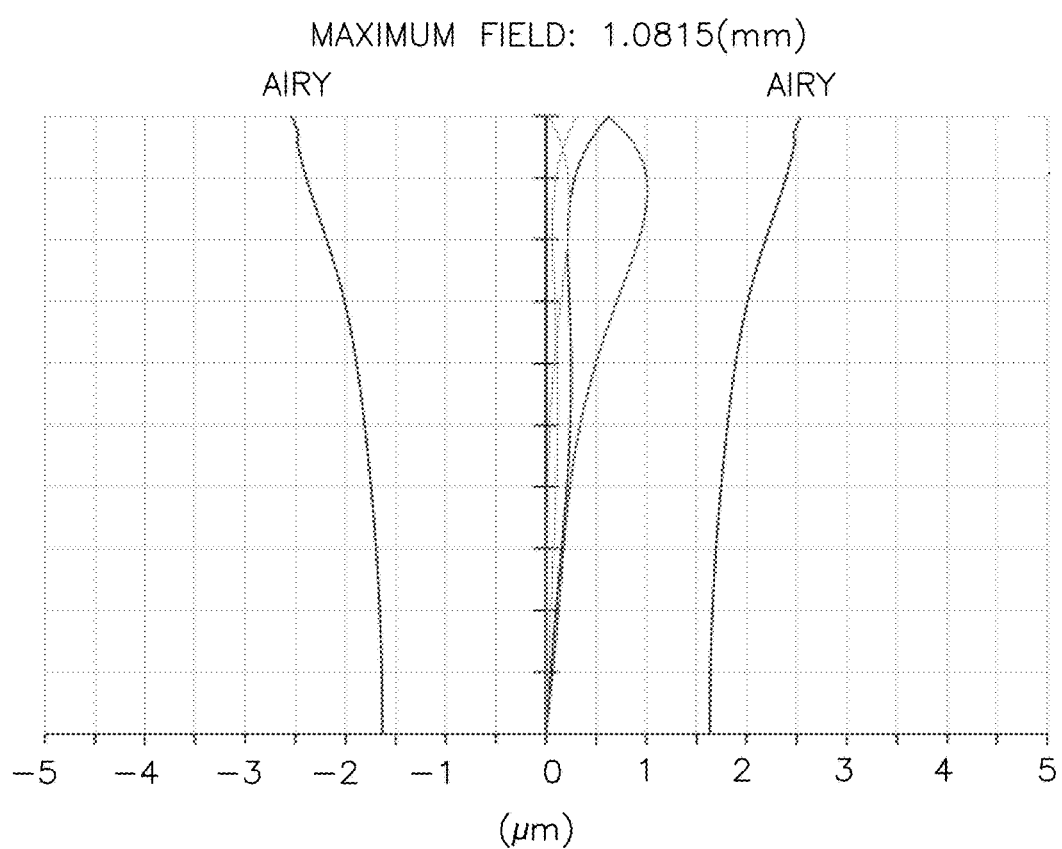
FIG. 3 is a graph showing lateral color aberration of the optical lens of the first embodiment.
Figure 4:
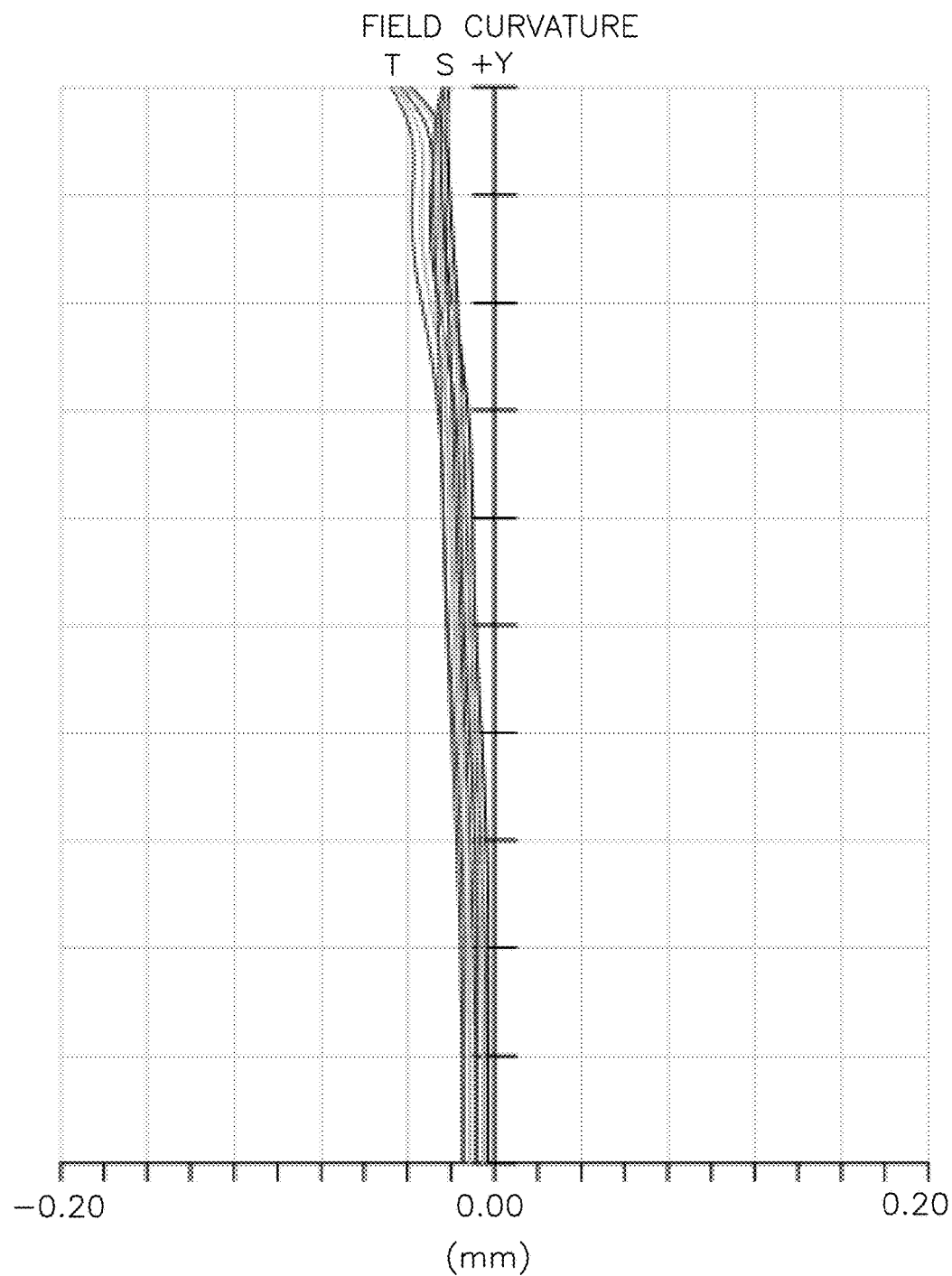
FIG. 4 is a graph showing field curvature of the optical lens of the first embodiment.
Figure 5:
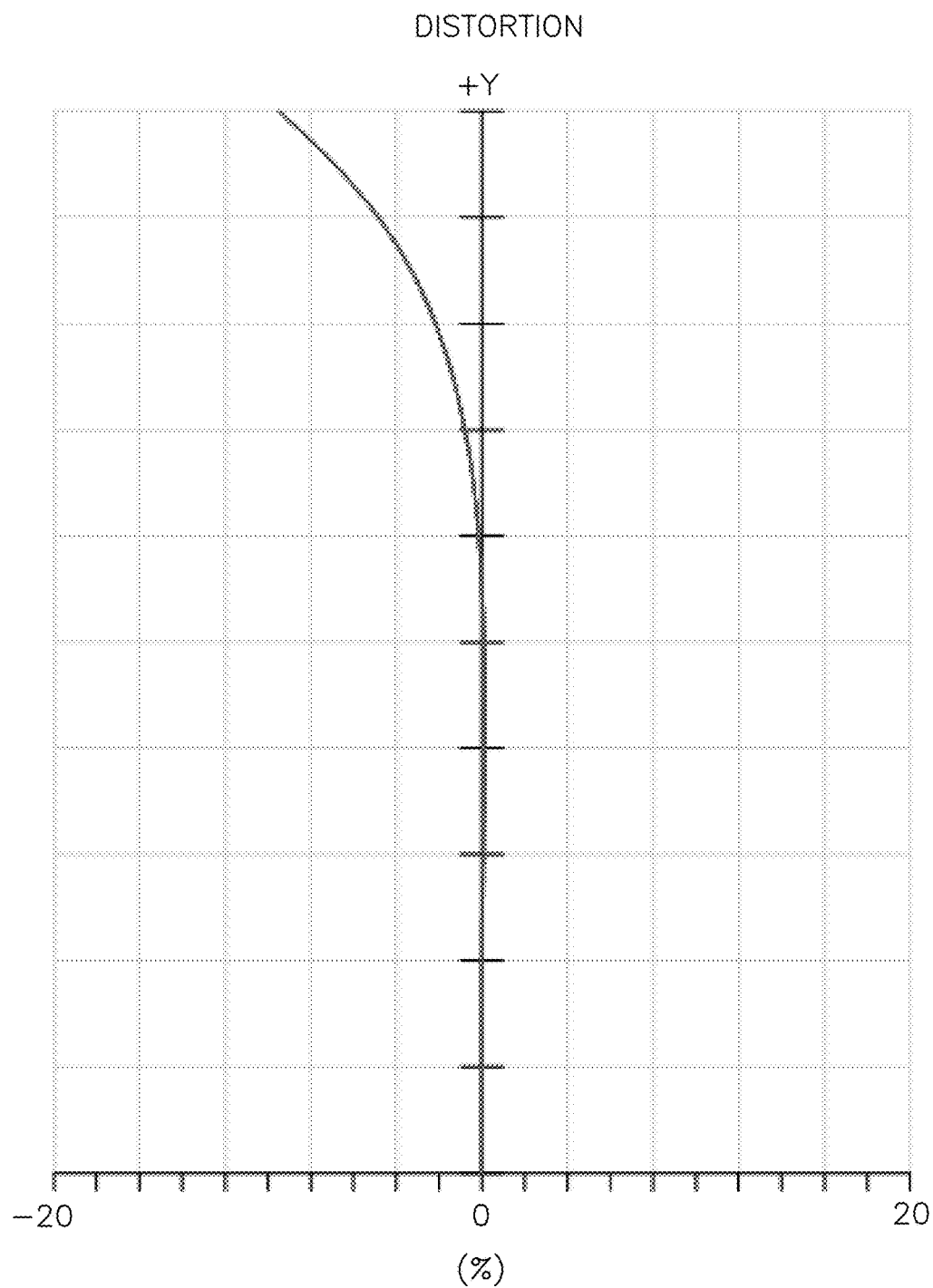
FIG. 5 is a graph showing distortion of the optical lens of the first embodiment.

In the first embodiment, the longitudinal spherical aberration graph, the lateral color aberration graph, the field curvature graph, the distortion graph of the optical lens are respectively shown in FIGS. 2-5. The longitudinal spherical aberration of visible light (with a wavelength between 400-700 nm) shown in FIG. 2 is within a range of −0.02—0.02 mm. The lateral color aberration of visible light shown in FIG. 3 is kept in −3 μm-3 μm. The sagittal field curvature and the tangential field curvature of visible light shown in FIG. 4 are kept in −0.04 mm~0. The distortion of visible light in FIG. 5 falls with a range of −10%~0. In the first embodiment, the longitudinal spherical aberration, field curvature, and distortion are well controlled in the optical lens.

Referring to tables 3-4 illustrates an optical lens of a second embodiment. In the second embodiment, the optical lens satisfies the parameters of Tables 3-4. The symbols listed below are used in Tables 3-4.

R: a radius of curvature.
L: a distance between surfaces on the axis 110.
N: a refractive index of lens element.
V: an Abbe number.
h: a height from the axis 110 to the surface.
k: a conic constant.

TABLE 3

| Surf. Type | # | Lens element | R | L(mm) | N | V | H | K |
|---|---|---|---|---|---|---|---|---|
| Object | | | Infinity | 44 | | | | |
| Even Asphere | First surface | First lens element | 1.67 | 0.30 | 1.53 | 56 | 0.97 | 0.81 |
| Even Asphere | Second surface | air space | 0.44 | 0.57 | | | 0.60 | −0.80 |
| Even Asphere | Third surface | Second lens element | 127.43 | 0.45 | 1.64 | 22.4 | 0.49 | 0.00 |
| Even Asphere | Fourth surface | air space | −1.41 | 0.17 | | | 0.40 | −5.25 |
| Standard | aperture | air space | Infinity | −0.02 | | | 0.26 | 0.00 |
| Even Asphere | Fifth surface | Third lens element | 1.84 | 0.25 | 1.53 | 56 | 0.26 | 15.17 |
| Even Asphere | Sixth surface | air space | −1.21 | 0.08 | | | 0.31 | 9.25 |
| Even Asphere | Seventh surface | Fourth lens element | 1272.89 | 0.25 | 1.67 | 19 | 0.32 | 0.00 |
| Even Asphere | Eighth surface | air space | 0.77 | 0.02 | | | 0.42 | −12.67 |
| Even Asphere | Ninth surface | Fifth lens element | 1.29 | 0.40 | 1.54 | 56 | 0.45 | 2.86 |
| Even Asphere | Tenth surface | air space | −0.58 | 0.01 | | | 0.49 | −5.18 |
| Even Asphere | Eleventh surface | Sixth lens element | 1.28 | 0.25 | 1.64 | 22.4 | 0.51 | −6.43 |
| Even Asphere | Twelfth surface | air space | 0.64 | 0.15 | | | 0.61 | −10.39 |
| Standard | Front surface | IRCF | Infinity | 0.30 | 1.52 | 54.5 | | |
| Standard | Rear surface | air space | Infinity | 0.26 | | | | |
| Sensor | | | Infinity | — | | | | |

TABLE 4

| Aspheric coefficient | First lens element | | Second lens element | | Third lens element | | Fourth lens element |
|---|---|---|---|---|---|---|---|
| | First surface | Second surface | Third surface | Fourth surface | Fifth surface | Sixth surface | First surface |
| A2  | 0        | 0         | 0        | 0        | 0         | 0         | 0 |
| A4  | −0.03561 | 0.21568   | −0.72477 | −0.04675 | 0.446478  | −1.13521  | −4.29950682 |
| A6  | −0.05966 | −0.74199  | 0.629878 | 1.967104 | −12.5681  | −0.37842  | 22.1997458 |
| A8  | −0.00766 | 3.10419   | 0.607679 | −7.98019 | 67.30297  | 1.88995   | −95.4300981 |
| A10 | 0        | −15.3372  | −6.39552 | −35.4948 | 60.35518  | −306.961  | −545.620884 |
| A12 | 0        | 0         | −22.8983 | 15.8115  | −22329.2  | −9227.62  | −2651.03952 |
| A14 | 0        | 0         | 28.73031 | 536.7729 | 74434.05  | 46382.85  | 17848.721 |
| A16 | 0        | 0         | 0        | 0        | 0         | 0         | 0 |

| Aspheric coefficient | Fourth lens element | Fifth lens element | | Sixth lens element | |
|---|---|---|---|---|---|
| | Second surface | Third surface | Fourth surface | Fifth surface | Sixth surface |
| A2  | 0         | 0        | 0         | 0         | 0 |
| A4  | −0.98494  | 0.104121 | 0.917593  | −0.93972  | −0.88368 |
| A6  | 5.585267  | 0.349546 | 0.584946  | −1.01414  | 0.995983 |
| A8  | −12.406   | −2.8455  | 2.223652  | 0.908176  | −1.08831 |
| A10 | −19.6021  | 0.411814 | −1.37418  | 4.860118  | −0.11518 |
| A12 | −230.861  | 21.83953 | −10.2477  | −16.8196  | 1.395569 |
| A14 | 568.823   | −396.55  | −188.247  | −102.332  | 1.78487 |
| A16 | 0         | 0        | 0         | 0         | 0 |

According to an example of the optical lens of the second embodiment, wherein: EFL=0.73; F=2.4; 2ω=94.9°; TTL=3.46; IMH=1.71; T45=0.02; T45M=0.05; N4/N5=1.06; V4/V5=0.40; f1/(f4*f5=1.37; D1/(R1*R2)=2.64.

In the second embodiment, the longitudinal spherical aberration graph, the lateral color aberration graph, the field curvature graph, and the distortion graph of the optical lens are respectively shown in FIGS. 6-9.

Figure 6:
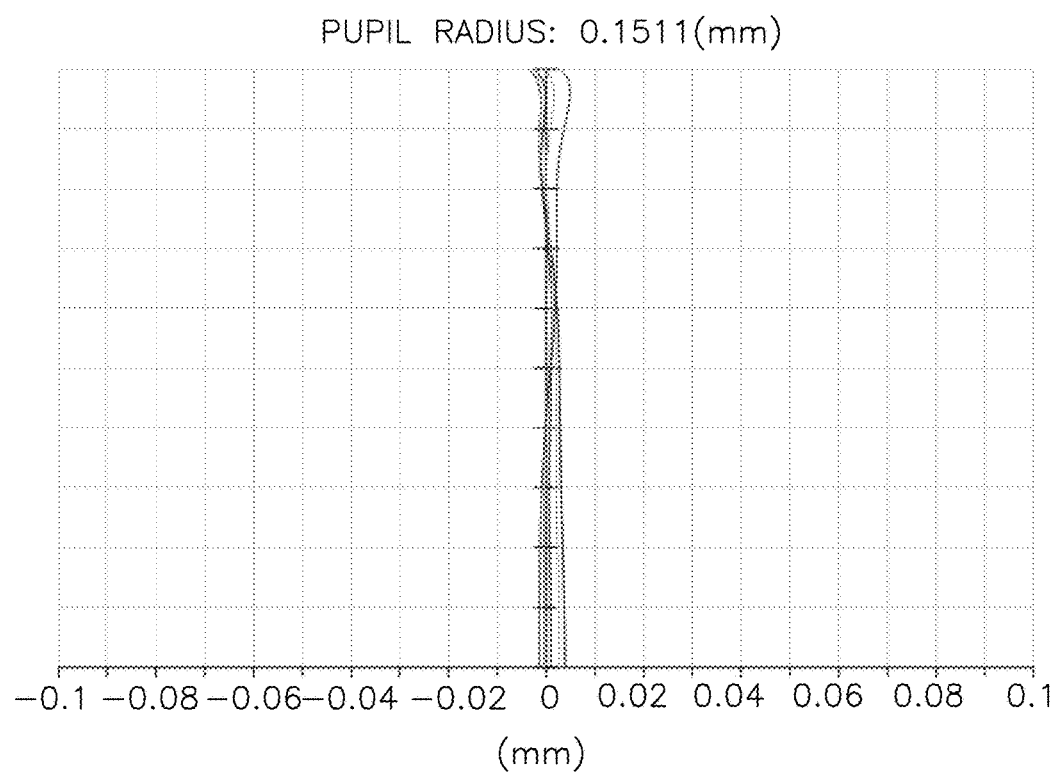
FIG. 6 is a graph showing longitudinal spherical aberration of the optical lens of a second embodiment.
Figure 7:
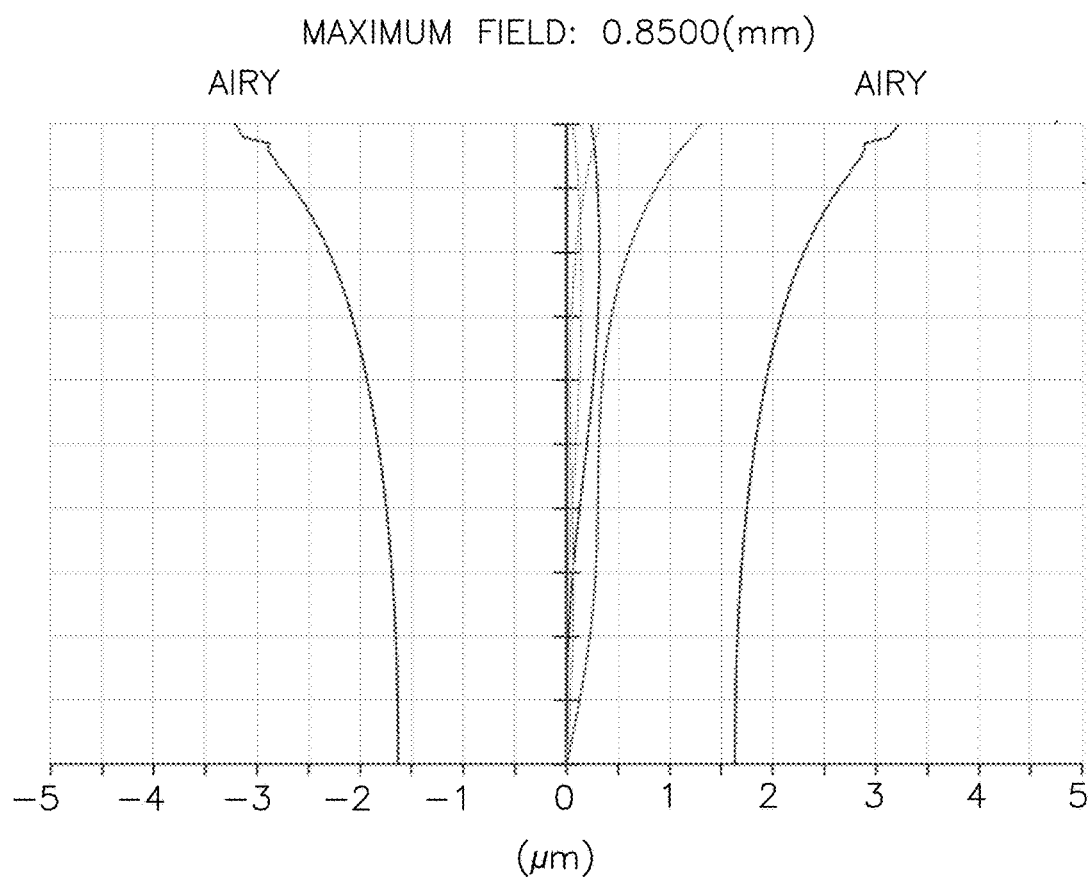
FIG. 7 is a graph showing lateral color aberration of the optical lens of the second embodiment.
Figure 8:
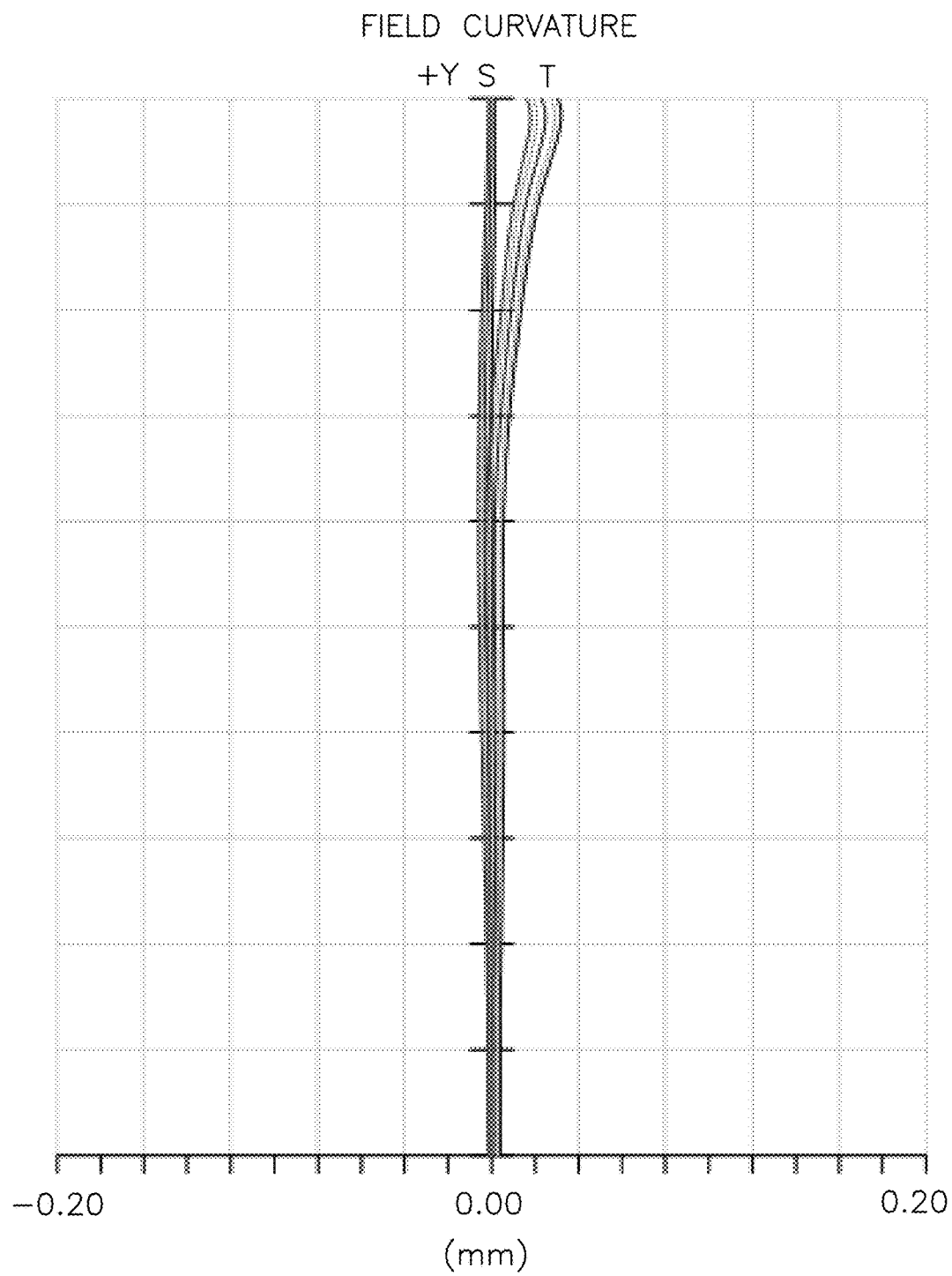
FIG. 8 is a graph showing field curvature of the optical lens of the second embodiment.
Figure 9:
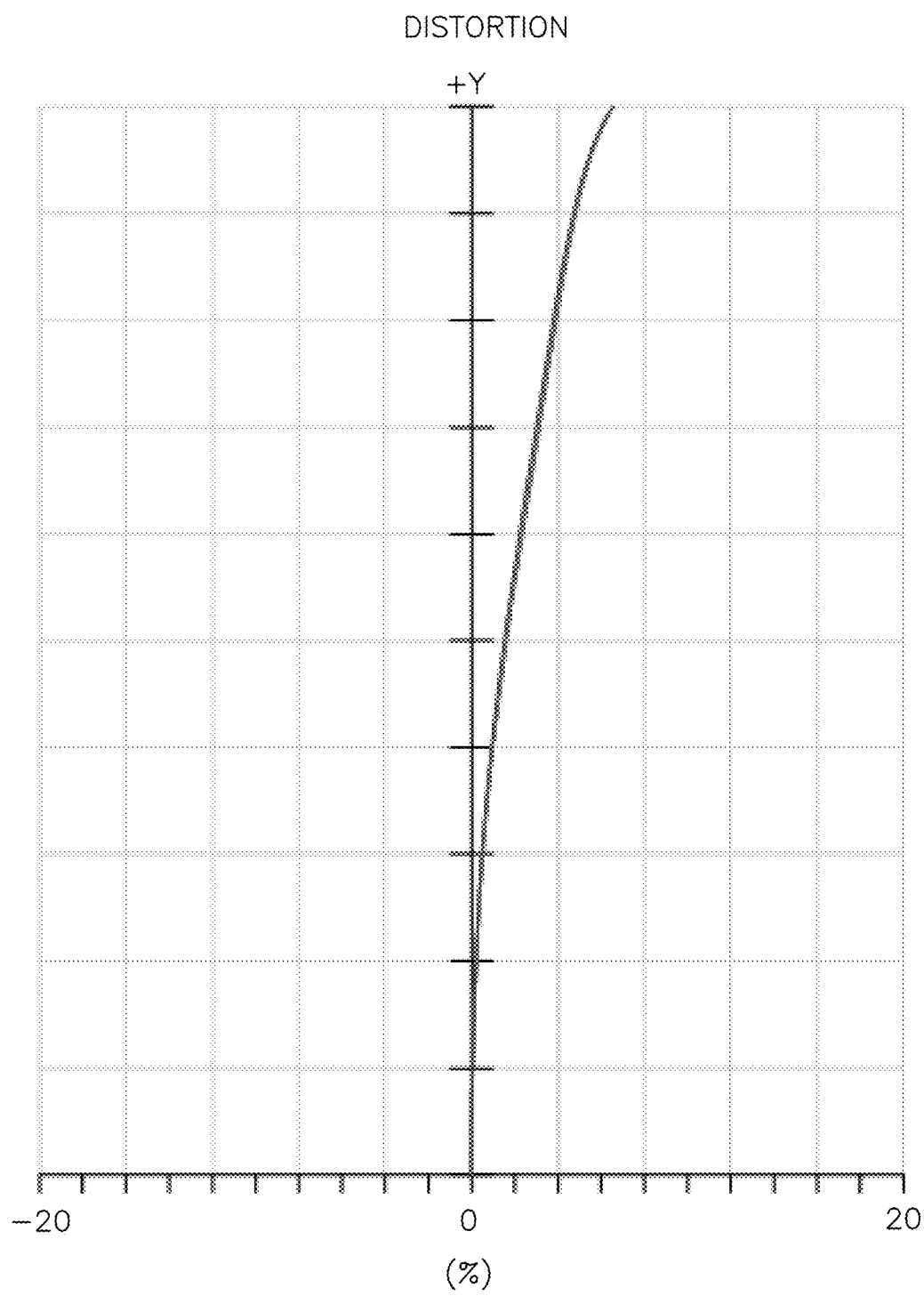
FIG. 9 is a graph showing distortion of the optical lens of the second embodiment.

The longitudinal spherical aberration of visible light (with a wavelength between 400-700 nm) shown in FIG. 6 is within a range of −0.01 mm—0.01 mm. The lateral color aberration of visible light shown in FIG. 7 is kept in −4 μm~4 μm. The sagittal field curvature and the tangential field curvature of visible light shown in FIG. 7 are kept in −0.02 mm~0.04 mm. The distortion of visible light in FIG. 7 falls within a range of 0~8%. Obviously in the second embodiment, the longitudinal spherical aberration, field curvature, and distortion are well controlled in the optical lens.

The embodiments shown and described above are only examples. Many details are often found in the art such as the other features of an optical lens. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens having an optical axis, the optical lens comprising in order from an object side to an image side:
    a first lens element having a first surface and a second surface opposite to the first surface;
    a second lens element having a third surface and a fourth surface;
    a third lens element having a fifth surface and a sixth surface;
    a fourth lens element having a seventh surface and a eighth surface;
    a fifth lens element having a ninth surface and a tenth surface;
    a sixth lens element having a eleventh surface and a twelfth surface; and
    a sensor; and
    an optical filter, the optical filter being mounted between the sixth lens element and the sensor, and the optical filter being spaced from the sixth element and the sensor;
    wherein the optical lens also comprises an aperture mounted between the second lens element and the third lens element, the optical lens satisfies the following formulas:
    0<T45< Wherein T45 is a center thickness of air space between the eighth surface and the ninth surface, T45M is maximal thickness of air space between the eighth surface parallel the optical axis to the ninth surface;
    wherein the optical lens satisfies the formula 0.77<f1/(f4*f5)<2.75, where f1 is the focal length of the first lens element, f4 is the focal length of the fourth lens element, and f5 is the focal length of the fifth lens element.

2. The optical lens of claim 1, wherein the aperture is located on the optical axis, a distance between the aperture and the fifth surface is smaller than a distance between the fourth surface and the aperture.

3. The optical lens of claim 1, wherein the optical filter has a front surface and a rear surface, the front surface and the rear surface are flat plane.

4. The optical lens of claim 1, wherein the first lens element, the fourth lens element and the sixth lens element have negative power, the second lens element, the third lens element and the fifth lens element have positive power.

5. The optical lens of claim 1, wherein the first surface is convex around the optical axis and toward the object side, a center of the second surface is concave around the optical axis and toward the image side, a periphery of the second surface is a flat surface, the third surface is concave around the optical axis and toward the object side, the fourth surface is convex around the optical axis and toward the image side, the fifth surface is convex around the optical axis and toward the object side, the sixth surface is convex around the optical axis and toward the image side, a center of the seventh surface is concave around the optical axis and toward the object side, the eight surface is concave around the optical axis and toward the image side, the ninth surface is convex around the optical axis and toward the object side, the tenth surface is convex around the optical axis and toward the image side, the eleventh surface is convex around the optical axis and toward the object side, the twelfth surface is concave around the optical axis and toward the image side.

6. The optical lens of claim 1, wherein the optical lens satisfies the formulas: 1.02<N4/N5<1.58, 0.28<V4/V5<0.85, N4 is refraction index of the fourth lens element, N5 is the refraction index of the fifth lens element, V4 is the abbe number of the fourth lens element, V5 is the abbe number of the fifth lens element.

7. The optical lens of claim 1, wherein the optical lens satisfies the formula 1.12<TTL/IMH<3.05, where TTL is total length, from center point of the first surface to the sensor, and IMH is the max image circle of the sensor.

8. The optical lens of claim 1, wherein the optical lens satisfies the formula 90°<2ω<150°, where ω is a half field view angle of the optical lens.

9. The optical lens of claim 1, wherein the optical lens satisfies the formula 0.35<D1/(R1*R2)<16.31, where D1 is clear aperture diameter of the first lens element, R1 is radius of curvature of the first surface of the first lens element, and R2 is radius of curvature of the second surface of the first lens element.

10. The optical lens of claim 1, wherein the first lens element, the second lens element, the third lens element, the fourth lens element, the fifth lens element and the sixth lens element are symmetrical about the optical axis.

* * * * *